Aug. 6, 1968  W. A. BOOTHE ET AL  3,395,719

FLUID-OPERATED CONTROL SYSTEM

Filed Sept. 23, 1964  4 Sheets-Sheet 1

Inventors:
Willis A. Boothe,
Warren A. Lanza,
by Paul A. Frank
Their Attorney.

Inventors:
Willis A. Boothe,
Warren A. Lanza,
by Paul A. Frank
Their Attorney.

Inventors:
Willis A. Boothe,
Warren A. Lanza,
by Paul A. Frank
Their Attorney.

United States Patent Office 3,395,719
Patented Aug. 6, 1968

3,395,719
FLUID-OPERATED CONTROL SYSTEM
Willis A. Boothe and Warren A. Lanza, Scotia, N.Y., assignors to General Electric Company, a corporation of New York
Filed Sept. 23, 1964, Ser. No. 398,686
12 Claims. (Cl. 137—22)

ABSTRACT OF THE DISCLOSURE

A hybrid fluidic control system comprises analog and digital fluidic circuits. The analog circuit includes an analog sensor for generating proportional type fluid signals proportional to the monitored value of error of a system parameter. The digital circuit includes a digital sensor, reference and beat frequency detector for generating fluid pulses of frequency equal to the difference between monitored and reference pulse frequencies. A fluidic binary counter and digital summer convert the difference-frequency pulses to a reset fluid signal proportional to the integral of the system parameter error. The proportional plus reset outputs of the respective analog and digital circuits are combined in an analog-type fluid amplifier which provides a transient fluid signal during an error between the monitored and reference value of the system parameter.

---

Our invention relates to fluid-operated control systems, and in particular, to isochronous control systems employing hybrid analog-digital fluid-operated control circuits for providing the various control system signals in fluid form.

In numerable instances, in all phases of technology, control systems of the closed loop type are employed to regulate a selected condition or control system variable to a desired value thereof. Control systems may be classified by the type of control employed therein. Thus, a first type of control system may be designated as an all-analog control which is characterized in general, by lower accuracy but an inherently fast response since the control information is available almost instantaneous, the delays in information being determined by the dynamic characteristics of transducers and the transducer circuitry employed. Conversely, a second type of control system, an all-digital control, is characterized, in general by extreme accuracy, but has an inherently slower response since the control information must be held constant until a change corresponding to the smallest desired unit of information has occurred or until some integral number of units have occurred if information resulting from higher order differences is to be used. In order to cause a digital-type transducer to provide information at a speed comparable to that obtained from analog-type transducers, it is necessary to employ very high information rates and a very small basic information unit of measurement. In many instances, this becomes impractical. A third type of control system generally known as a hybrid analog-digital control system makes use of the fast response capabilities of the analog system and the extreme accuracy of the digital system.

The selected condition or control system variable to be regulated may be, as an example, the magnitude of a rotational velocity such as that of a prime mover, a frequency, the liquid level within an enclosed container, or the pressure or temperature of a gas or liquid. In effect, the selected control system variable may comprise any function or condition which can be sensed and monitored to provide a signal or other indication of particular values thereof.

Frequently, the region in which the control system operates introduces extreme environmental problems, such as shock, vibration, nuclear radiation and high temperature. Prior art systems, particularly those comprising electronic elements and nonfluid mechanical elements, are incapable of withstanding such extreme environmental conditions and thus do not continue performing in a satisfactory manner.

In contradistinction, fluid control devices, especially of the type known as fluid amplifiers, features reliability and an essentially unlimited life span since generally they employ neither mechanical moving parts, thereby avoiding frictional wear, nor parts undergoing self-deterioration or dissipation in operation, thereby avoiding a limited life span such as that experienced in an electron tube due to cathode deterioration. Further, they can be produced at low cost due to their ease of fabrication from virtually any material that is nonporous and has structural rigidity. In addition, the devices may be connected in circuit relationship either by appropriate interconnection of individual devices or by the formation of the devices in interconnected fashion directly in a single piece of material. Fluid control devices are thus particularly ideal for applications wherein conditions of nuclear radiation, high temperature, vibration and mechanical shock may be present.

Since fluid control devices, especially of the fluid amplifier type, operate satisfactorily in a variety of environmental conditions in which electronic and purely mechanical devices normally fail, there is a need for obtaining a control system, and in particular, a control system of the hybrid analog-digital type, comprised of the above-mentioned fluid control devices.

Therefore, one of the principal objects of our invention is to provide a hybrid analog-digital control system employing fluid as the operating medium.

Another object of our invention is to provide a hybrid analog-digital control system employing fluid control devices connected in circuit relationship for regulating a control system variable to a desired value thereof.

A still further object of our invention is to employ fluid control devices of the fluid amplifier type in the hybrid analog-digital control system.

Briefly stated, our invention is a fluid-operated control system of the hybrid analog-digital type. The control system, in accordance with our invention, includes a first and second control circuit. The first control circuit comprises an analog-type sensor for generating an analog-type pressurized fluid signal having a magnitude proportional to the monitored value and thus any error of a selected control system variable. The second control circuit comprises the digital portion of the hybrid system and includes a digital-type sensor for generating pressurized fluid pulses having a frequency proportional to the monitored value of the control system variable. The digital circuit further employs a digital reference means for generating pressurized fluid pulses having a frequency proportional to a desired value of the control system variable. The pressurized fluid signals from the digital sensor and the digital reference means are supplied to a fluid-operated beat frequency detector which, in the presence of an error in the monitored value of the control system variable, generates pressurized fluid pulses having a frequency equal to the frequency difference between the monitored and reference pulse frequencies. The difference-frequency fluid signal is supplied to a fluid-operated binary counter (intergrator) such that the counter output also provides digital fluid signals which are combined in another fluid amplifier device to generate a quantized fluid signal having a pressurized flow rate proportional to the control system variable error, that is, representing an integral function of the error. The quantized fluid signal and the analog signal are combined in an analog-type fluid amplifier to provide a pressurized fluid signal for regulating the control system variable to the desired value.

The control system may be described as an isochronous control system in that it obtains two types of information in fluid form, the first being the magnitude of any error that may exist (the analog control circuit) and the second being the integral of such error (the digital circuit). At steady state conditions, the output of the digital circuit provides a fluid signal that maintains an apparatus controlled by the control system at a desired load condition and at the desired value of the selected control system variable with high accuracy. The analog circuit obtains a proportional fluid signal necessary for good transient performance of the control system.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference character, and wherein:

Figure 1:
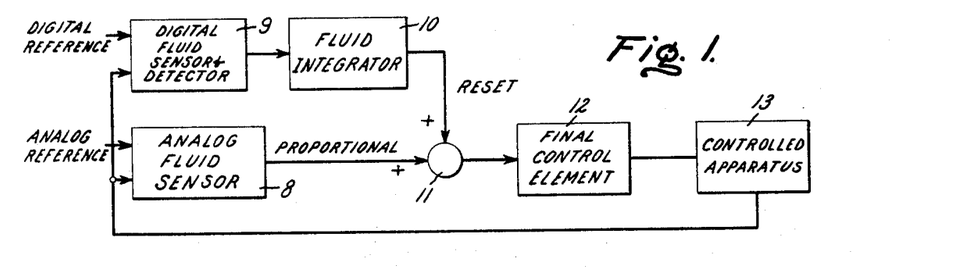
FIGURE 1 is a simplified block diagram representation of an isochronous, hybrid analog-digital, fluid-operated control system.

Referring now to the drawings, in FIGURE 1 there is shown a simplified block diagram of an isochronous fluid-operated control system of the hybrid analog-digital type. An isochronous control system, in general, requires at least two types of information for its operation, a first type relates to the magnitude of any error that may exist in the value of a selected control system variable being regulated, and the second type may relate to the integral of the error. For optimum control system operation, the first type of information, which governs in particular the initial transient performance of the control system, necessitates a minimum time delay between the existence of the error and the control system's knowledge of the error's existence. The magnitude of error that results during the initial phase of a transient condition is thus primarily determined by the gain or regulation of a circuit providing the first type of information. The second type of information, which governs the steady-state performance of the control system, necessitates a highly accurate signal that determines the steady-state power supplied to the apparatus being controlled in the system. The second type of information provides a resetting action which decreases the error to zero with time, the reset time being primarily determined by the desired stability of a circuit providing the second type of information. Thus, the isochronous control system may be considered to consist of at least two loops wherein the first loop obtains the first type of information by comparing the monitored value of the control system variable with a desired or reference value thereof. Any difference between the monitored and reference values produces a transient error signal which operates a final control element in a proportional manner, the final control element in turn adjusting the apparatus being controlled by the system in response to the error signal. The second loop operates in parallel combination with the first loop and, in general, also compares the monitored value of the control system variable with a reference. However, the second loop produces a signal which is proportional to the integral of the error. Since the integral of error may have a steady-state value, the steady-state integral signal establishes the steady-state operating conditions of the control system. From such considerations, the generalization can be made that the first loop should have a high speed of response and the second loop operate with a high degree of accuracy.

An isochronous control system may be employed to regulate virtually any selected condition or control system variable which can be sensed and monitored to provide a signal or other indication of particular values thereof. For exemplary purposes only, the isochronous control system illustrated in FIGURE 1 will be described with reference to a speed control system for a prime mover, and in particular, for a steam turbine.

Fluid control devices of the type known as fluid amplifiers, in general, employ no moving mechanical parts and are especially well adapted for use in extreme environmental conditions such as vibration and high temperature which are associated with prime movers and in particular, steam turbines. Thus, an isochronous control system having components comprised primarily by fluid amplifiers and a minimum number of nonfluid amplifier components is especially advantageous in a steam turbine speed control system.

Two of the basic types of fluid control devices known as fluid amplifiers are generally referred to as the analog and digital types. Since digital control systems are characterized by a high accuracy of operation, it would apparently be advantageous to construct the isochronous control system as an all-digital system. Unfortunately, the switching rate of digital-type fluid amplifiers is relatively slow and because of this limitation it is not possible to develop a relatively high performance closed loop control system without encountering switching component response limitations in transient operation. In like manner, all-analog control systems are characterized by a high speed of response and, thus, are preferred for transient operation, but unfortunately, most analog-type fluid speed sensors developed to date are not especially noted for high accuracy. Because of this fact, it is desirable to use fluid amplifier logic elements in a manner that realizes their greatest potential. A combined or hybrid analog-digital isochronous control system is an example of such an approach.

In FIGURE 1, the analog portion of the hybrid analog-digital system is an analog-type fluid sensor designated by numeral 8, and comprises a fluid-mechanical device in the particular application of a steam turbine speed control system. Analog sensor 8 generates an analog-type fluid signal having a magnitude of pressurized flow proportional to the monitored or actual value of the selected control system variable to be regulated (turbine speed in the illustrated example). An analog reference fluid signal of magnitude proportional to the desired value of the control system variable may also be provided to obtain a resultant analog error signal.

The digital portion of the control system, that is, the second loop above-described, comprises a fluid sensor and detector 9 and a fluid integrator 10. The sensor portion of the sensor and detector 9 may also comprise a fluid-mechanical device in the particular application of a turbine speed control system and generates pressurized fluid signals of a desired wave form as determined by the particular construction of the sensor. Typical wave forms are square shaped or sinusoidal pulses. A fluid reference generator is employed to generate reference pulses having a frequency proportional to the desired value of the control system variable. The fluid reference generator provides pressurized fluid signals having a wave shape, in general, the same as that produced by the sensor. The detector portion of sensor and detector 9 comprises digital (or analog)-type fluid amplifier circuitry in communication with the fluid reference generator and sensor for generating a signal comprising fluid pulses having a frequency proportional to the difference between the monitored value and reference value of the control system variable. The difference-frequency fluid pulses are supplied to integrator 10 which comprises a reversible binary fluid counter constructed from digital-type fluid amplifiers. The state of the counter is converted to an analog-type quantized fluid signal such that the quantized signal represents the integral of error in the control system variable.

The operation of the control system with reference to the two above-described loops and FIGURE 3 may be summarized as follows. Under transient operation of the control system, that is, when the actual value of the control system variable is not equal to the desired value thereof (turbine speed error is not zero), the first or analog loop provides a proportional fluid signal (proportional to the magnitude of speed error). Under transient operation, the second or digital loop provides a fluid signal which increases or decreases at a rate proportional to the error in the actual value of the control system variable (speed error) to thereby provide a signal representing the integral of such error. The second loop thus provides the slower reset action or digital fine frequency trim which is necessary for steady-state accuracy in the well-known "proportional plus reset" control system. During steady-state conditions, the proportional error signal generated by the analog loop is zero and the reset signal generated by the digital loop supplies the turbine load requirements. The proportional and reset fluid signals are combined in a fluid control device 11 comprising an analog-type fluid amplifier which, in turn, operates a final control element 12. In the steam turbine application, the final control element may be the actuating piston of a steam valve and the output of fluid amplifier 11 thus regulates the steam flow to a controlled apparatus 13 which may be a prime mover apparatus such as a steam turbine.

Figure 2:
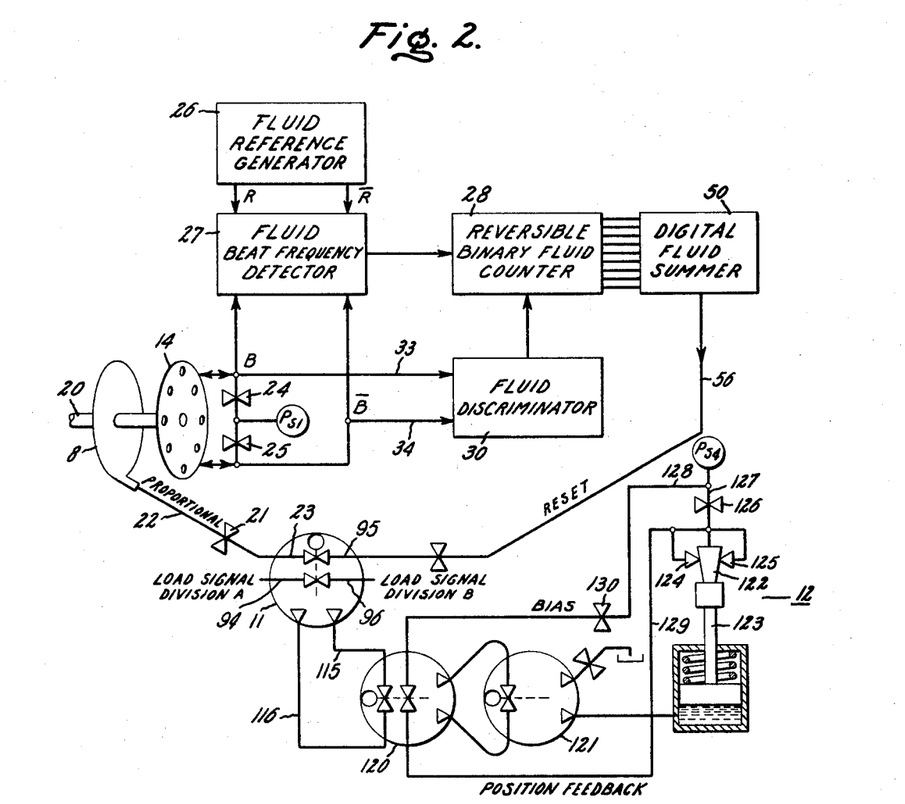
FIGURE 2 is a more detailed combined block and schematic diagram representation of a control system similar to that illustrated in FIGURE 1, constructed in accordance with our invention, and is exemplified in terms of a prime mover speed control system.

The fluid-operated isochronous control system illustrated generally in the block diagram of FIGURE 1 will now be described in greater detail with reference to the combined block and schematic diagram of FIGURE 2 which, although directed to a steam turbine speed control system, is understood to apply to other prime movers, and with appropriate substitution of the sensors and final element, may apply to any control system. The lines interconnecting the various components of the control system shown in FIGURE 2 are understood to comprise suitable conduits for passage of the fluid signals. The analog loop of the proportional plus reset control system utilizes a drag type water pump as an analog speed sensor 8 to generate a pressurized fluid signal having a magnitude proportional to the monitored speed of the turbine. The drag pump is mounted on the shaft 20 of the turbine which comprises the controlled apparatus 13 (in FIGURE 1). The drag pump or a centrifugal pump are especially well adapted for use as analog speed sensors for the case wherein the fluid medium employed in the control system is the steam turbine feed water or condensate water. In the case wherein compressed air of the turbine boiler steam supply is employed as the fluid medium, a drag type or centrifugal compressor may be used as the analog speed sensor 8. A fluid flow restrictor 21 is provided within a conduit 22 which transmits the proportional fluid signal from the output of analog speed sensor 8 to a first control fluid inlet 23 of analog-type amplifier device 11. The restrictor 21 modifies the pressure of the fluid signals to obtain signals having pressure ranges suitable for use with the particular fluid amplifier 11 employed.

The digital loop of the proportional plus reset control system utilizes a conventional simple chopper 14 mounted perpendicularly or angularly disposed on turbine shaft 20 to generate fluid pulses having a frequency proportional to the monitored value of the control system variable being regulated (turbine shaft speed). Chopper or sensor 14 is a fluid-mechanical device comprising a disk having a plurality of equally spaced holes along the periphery thereof. The holes may be rectangular in shape (for generating square wave pulses) or, more preferably, circular in shape (for generating sinusoidal wave shaped pulses). A source of relatively constant pressurized fluid $P_{s1}$ supplies a fluid stream through flow restrictors 24 and 25 and associated conduits to the chopper which is adapted to intermittently interrupt the fluid stream and thereby generate a pair of 180° displaced pressurized fluid signals B, $\overline{B}$, having a frequency proportional to the monitored value of the turbine speed. The fluid wave indicated by the symbol $\overline{B}$ indicates the absence (and B the presence) of a fluid signal in the case of square wave generated pulses in accordance with standard logic notation, whereas $\overline{B}$ indicates the complement of fluid signal B in the case of sinusoidal generated pulses.

The digital loop also includes a fluid reference generator 26 comprising a fluid-operated network for providing pressurized fluid pulses having a constant frequency proportional to a desired value of the control system variable, turbine speed in the illustrated example. The reference generator provides a fluid signal having a wave form, in general, the same as that produced by the sensor 14. The reference fluid signal may be obtained from a fluid-operated tuning fork oscillator of the type described in a co-pending patent application entitled "Fluid-Mechanical Oscillator," Ser. No. 344,500, now Patent No. 3,333,-596, inventor Salvatore Bottone, Jr., assigned to the assignee of the present invention. Such oscillator employs a mechanical resonant member and associated fluid amplifier circuitry to obtain a fluid signal comprising pressurized pulses having a constant and predetermined frequency. The fluid waves generated by fluid reference generator 26 is indicated by symbols R and $\overline{R}$ where $\overline{R}$ indicates the absence of a fluid pulse or complement thereof as mentioned with relation to $\overline{B}$. For convenience, the fluid reference generator 26 and sensor 14 will hereinafter be referred to as digital reference generator and digital sensor, respectively, it being understood that the outputs thereof may be of square wave or sinusoidal form.

The complementary or push-pull fluid waves B, $\overline{B}$ and R, $\overline{R}$ generated, respectively, by digital fluid sensor 14 and digital fluid reference generator 26 are supplied to a fluid-operated beat frequency detector 27 which generates, in response thereto, an error fluid wave of a variable frequency characteristic proportional to the difference between the desired and monitored values of the control system variable. Thus, fluid detector 27 performs a heterodyning function and the output thereof is a difference-frequency fluid signal comprising pressurized fluid pulses having a frequency equal to the difference between the frequency of pulses generated by digital reference generator 26 and digital sensor 14. The fluid-operated beat frequency detector may be of the type described in the co-pending patent application of Willis A. Boothe, entitled "Fluid-Operated Detectors," Ser. No. 356,103, now Patent Number 3,285,264, assigned to the assignee of the present invention. The fluid-operated beat frequency detector described within the latter mentioned co-pending patent application comprises first and second stages of fluid amplifier devices connected in circuit relationship according to a predetermined logic function such that the output from the second stage provides complementary or push-pull fluid waves (pressurized pulses) having as frequency components the sum-frequency and difference-frequency of the input fluid waves supplied to the first stage. Suitable filter means are provided to remove the sum-frequency waves. In addition, a fluid pulse generator (not shown) may be connected to the output of the detector to obtain the particular pulses illustrated in FIGURE 3d. Alternatively, the output of the detector may be amplified to obtain saturation and thereby obtain equal on-off pulses having a frequency proportional to the magnitude of the error.

The difference-frequency fluid wave generated within beat frequency detector 27 is supplied to a fluid-operated reversible binary counter 28. The fluid-operated reversible binary counter may be of the type described in a copending patent application entitled "Fluid-Amplifier Circuit," Ser. No. 305,051, now Patent Number 3,199,782, inventor, Jeffrey N. Shinn, assigned to the assignee of the present invention. The reversible binary counter described in the latter mentioned patent application comprises a selected number of serially connected binary logic stages wherein each stage comprises three interconnected digital-type fluid amplifiers. The first fluid amplifier in each stage converts successive input fluid pulses into alternate fluid flows which determine the particular state of binary logic in each respective stage. The second and third fluid amplifiers in each stage determine the direction of pulse counting (forward or reverse, that is, up or down).

Binary counter 28 is adapted to count in a forward or reverse direction as instructed by a fluid signal obtained from a fluid-operated discriminator 30. The function of discriminator 30 is to determine which of the fluid signals generated by digital reference generator 26 and digital sensor 14 is at the higher frequency in the presence of a difference-frequency signal supplied from beat frequency detector 27 and thereby instruct the reversible counter to count either in a forward or reverse direction. A fluid-operated discriminator circuit, constructed in accordance with our invention, and which may be used in our control system is illustrated schematically in FIGURE 4a. The discriminator circuit includes a pair of tuned resonant vibrating members comprising any of a number of spring mass devices having natural vibration (resonant) frequencies, respectively above and below a desired value of frequency which is proportional to the desired value of the control system variable. As indicated by the frequency-pressure distribution characteristics in FIGURE 4b, the tuned resonant devices are selected such that the difference between the resonant frequency of each device is quite small and a very sharp characteristic is thereby obtained. The two spring mass devices are illustrated schematically in FIGURE 4a as tuned reeds 31 and 32 wherein reeds 31 and 32 are selected to have resonance frequencies $f_{31}$ and $f_{32}$, respectively, slightly below and slightly above an intermediate frequency which is proportional to the desired value of the control system variable. The fluid waves B and $\bar{B}$ generated by digital fluid sensor 14 supply their 180° phase displaced pressurized fluid pulse signals, having a wave shape such as sinusoidal, to the tuned resonant devices 31, 32 by means of conduits 33 and 34, respectively, to provide a driving force to such devices at a frequency determined by the monitored value of the control system variable. The resonant device(s), upon being actuated by 180° phase displaced signals of frequency within the frequency response of the resonant device, is vibrated at an amplitude determined by the proximity of the monitored frequency to the resonant frequency of the resonant device. Conduits 33 and 34 are in communication with two pairs of opposite disposed nozzles 35, 36, and 37, 38, each pair of nozzles associated with a respective tuned resonant device, directed thereagainst, and positioned intermediate the ends thereof. The free end of each resonant device has formed thereon a fluid intercepting member positioned in alignment between a sensing nozzle (not shown) supplied from a source of substantially constant pressurized fluid and a sensing fluid receiver 39, 40. Sensing receivers 39 and 40 are in communication with the two oppositely disposed control fluid inlets 41 and 42, respectively, of a conventional digital-type fluid amplifier designed to provide a memory function and being designated as a whole by numeral 43. The memory function maintains a power jet of fluid generated within the amplifier in an attached relationship to a selected side wall thereof in the absence of a control jet flowing in a direction to switch the power jet to an opposite side wall.

Figure 4A:
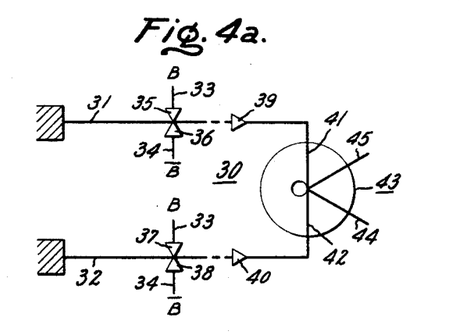
FIGURE 4a is a schematic representation of a fluid-operated component designated as a discriminator in FIGURE 2.
Figure 4B:
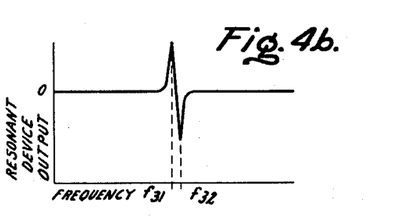
FIGURE 4b is a plot of the pressure output vs. frequency response characteristics thereof.

The operation of the discriminator circuit 30 is now described. Assume the monitored value of the control system variable is less than the desired value (turbine speed is below 100% of rated speed). Under such condition, tuned resonant device 31 is excited into a vibratory state by the fluid driving force exerted against the sides of device 31 from the pressurized fluid issuing from nozzles 35 and 36. The vibration of device 31 causes a fluid signal to be transmitted from the sensing nozzle to the sensing receiver 39 and thence to control fluid inlet 41 of digital fluid amplifier 43. The signal within control fluid inlet 41 causes a power jet of fluid generated within fluid amplifier 43 to become attached to a side wall of the interaction chamber thereof adjacent fluid receiver 44 such that a mutually exclusive flow of pressurized fluid passes into such receiver. A fluid signal within receiver 44 indicates a "speed low" condition of the turbine speed control system. In like manner, an overspeed of the turbine causes vibration of resonant device 32 thereby providing a fluid flow into sensing receiver 40 and thence to control fluid inlet 42 thereby switching the power jet within digital amplifier 43 to fluid receiver 45 to indicate a "speed high" condition. Since the control fluid inlets 41, 42 are disposed in opposing relationship, the frequency-pressure distribution characteristic obtained by the two resonant devices has a positive and negative response as indicated in FIGURE 4b.

Figure 5A:
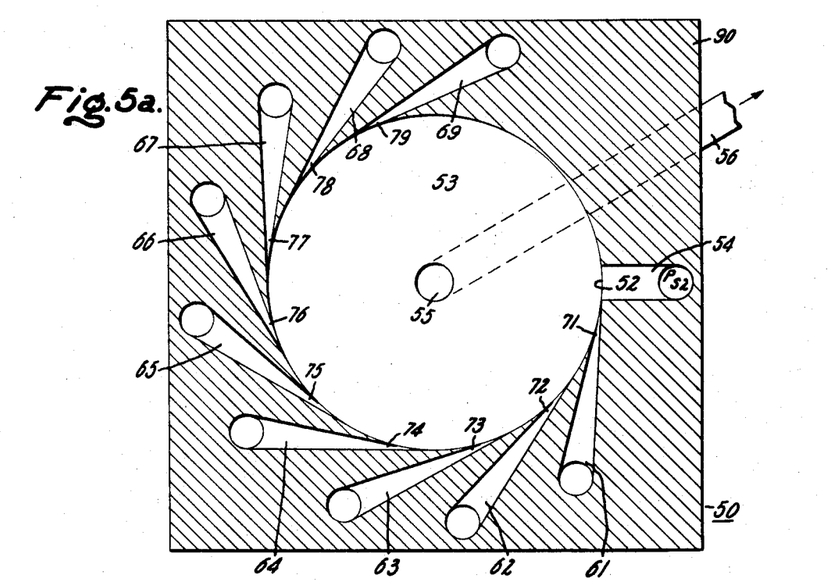
FIGURE 5a is a diagrammatic view in top plan of a vortex type fluid amplifier embodiment of a fluid control device which converts the state of the binary counter illustrated in FIGURE 2 to a quantized fluid signal.

The reversible binary fluid counter 28 is provided with a difference-frequency fluid signal from fluid beat frequency detector 27 and a sensing signal from fluid discriminator 30 which instructs counter 28 to count the pulses generated by detector 27 in either a forward or reverse direction. The digital fluid signals developed within counter 28 are supplied to a fluid amplifier circuit 50 which converts the state of the counter to an analog-type quantized pressurized fluid signal, the reset signal, having a wave form such as shown in FIGURE 3e. The number of output conduits of counter 28 are equal to the number of stages comprising such counter and the digital outputs are summed within fluid amplifier circuit 50. Two embodiments of the fluid amplifier digital summing device 50 constructed in accordance with our invention are illustrated in FIGURE 5 wherein a vortex-type fluid amplifier summer is illustrated in FIGURE 5a. A three-stage operational amplifier comprising three analog-type fluid amplifiers serially connected to obtain the high gain and resultant high accuracy of addition of an operational amplifier is illustrated in FIGURE 5b.

Referring now to the vortex-type fluid amplifier summing device illustrated in the top plan view of FIGURE 5a, there is shown a chamber defined by a cylindrical wall 52, a bottom planar portion 53 defining a cup-shaped cavity and a top planar portion (not shown) for confining fluid flow within the chamber. A pressurized supply or power fluid is continuously supplied radially inward to the chamber by means of conduit 54 in communication with a source of relatively constant pressurized fluid $P_{s2}$. Conduit 54 passes through cylindrical wall 52. The fluid supplied to chamber 53 from conduit 54 flows radially inward within chamber 53 and directly to a discharge opening 55 located at the center of bottom planar portion 53 in the absence of any control fluid flow. A conduit 56 is in communication with discharge opening 55 for conveying the discharged fluid away from the vortex device, and to fluid signal combining device 11. A plurality of tangentially disposed nozzles are arranged peripherally in cylindrical wall 52 such that any control fluid jet(s) issuing therefrom is directed tangentially into the chamber and in intersecting relationship with the supply fluid issuing from conduit 54 to thereby produce a resultant spiral or vortex flow of fluid within the chamber that exits therefrom through discharge opening 55. The vortex of control fluid within the chamber creates a back pressure which impedes and, consequently, regulates the flow of supply fluid issuing from conduit 54. The control fluid jets are supplied to the chamber in a direction substantially normal to the supply fluid flow and the pressure of the control jet may be of sufficient magnitude to completely impede the passage of supply fluid into the chamber. Under such latter condition wherein the supply fluid is completely impeded, only control fluid is passed through discharge opening 55. The degree of impedance to the supply fluid flow is thus determined by the magnitude of the pressure of the control fluid jet(s). The binary fluid counter 28 is illustrated in FIGURE 2 as comprising 9 stages of serially connected binary logic and thus 9 outputs are indicated therefrom. Each binary counter output is in communication with a conduit, that, in turn, is in communication with an associated control fluid nozzle of the vortex amplifier. Thus, conduits 61 through 69 are in communication with the nine outputs of counter 28 and control fluid nozzles 71 to 79 pass through cylindrical wall 52 in a tangential direction. Control fluid nozzles 71 to 79 may be suitably dimensioned to obtain weighted pressurized flows from the nozzles such that each counter output has the desired effect on the supply fluid within the chamber.

Figure 5B:
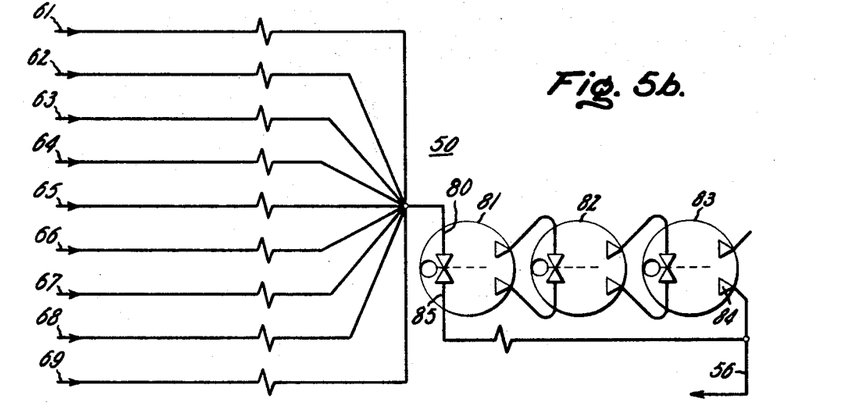
FIGURE 5b is a schematic diagram of a fluidic operational amplifier embodiment for providing such function.

The second embodiment of a fluid amplifier summing device adapted to convert the state of binary counter 28 to an analog-type quantized fluid signal is schematically illustrated in FIGURE 5b. The summing device in FIGURE 5b comprises an odd number of analog-type fluid amplifiers connected in series circuit relationship with feedback to form what is generally known as an operational amplifier in the analog computer art. An operational amplifier must have high gain in order to obtain a high accuracy when performing a summing function. Thus, three analog-type fluid amplifiers 81, 82, 83 are indicated in FIGURE 5b, it being understood that five or more odd numbered amplifiers may be employed to obtain the sufficient gain and resultant accuracy desired. The fluid signals to be summed are supplied to a first control fluid inlet 80 of the first stage 81 of the serially connected analog-type fluid amplifiers by means of conduits 61 through 69. Appropriate linear fluid resistors which may comprise capillary flow passages are provided in conduits 61 through 69 to obtain desired or weighted magnitudes of each of the counter outputs at the summing point. The analog-type fluid amplifiers have a configuration such as that illustrated in FIGURE 6 with the exception that only one pair of opposed control fluid inlets are provided in each of amplifiers 81, 82 and 83. The series connection of amplifiers 81, 82 and 83 is obtained by connecting the fluid receivers of each stage to the control fluid inlets of the next succeeding stage. Fluid receiver 84 of the third stage is in communication with a second control fluid inlet 85 of the first stage amplifier 81 such that a negative feedback flow of fluid is obtained through a suitable fluid flow restrictor for maintaining stability of the operational amplifier. Conduit 56, in communication with fluid receiver 84, provides passage for the analog-type quantized fluid signal, the reset signal, to the signal combining fluid control device 11. A push-pull output signal may be obtained from the fluid amplifier circuit illustrated in FIGURE 5b by having conduits in communication with each of the two receivers of the third stage fluid amplifier 83. It is to be understood that the vortex amplifier of FIGURE 5a may likewise have conduits 61 to 69 provided with suitable linear fluid resistors and thence connected at a common summing point whereby a single control fluid nozzle may be employed as in the case of FIGURE 5b.

Figure 6:
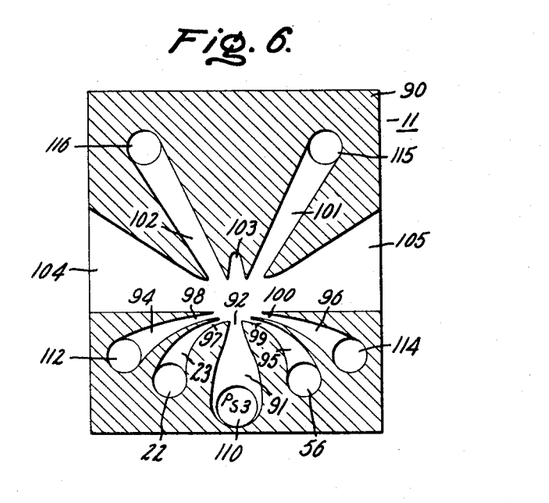
FIGURE 6 is a diagrammatic view in top plan of a four input fluid amplifier of the analog type shown schematically in FIGURE 2.

The proportional signal generated by analog fluid sensor 8 and the reset signal generated by summing device 50 are combined in a signal combining fluid control device 11 comprising a four input analog-type fluid amplifier which is described in detail with reference to FIGURE 6. Referring now to FIGURE 6, there is shown a diagrammatic representation in top plan of a momentum-exchange type of fluid control device herein referred to as a four input analog-type fluid amplifier. A base member 90 in which the device is formed may be selected from virtually any material that is nonporous, has structural rigidity, and is nonreactive with the fluid medium employed. It is to be understood that all of the fluid amplifier devices herein described are formed within this type of material. Illustratively, various plastics may be employed quite advantageously for this purpose, such material permitting low temperature molding to form the interior channels and passages for the fluid medium. Alternatively, materials adaptable to photoetching processes may be employed, for facilitating mass production of the fluid control devices. In addition, metal and other material of a more durable nature may be employed and may be slotted or molded to the desired configuration. A face plate (not shown) is positioned over the base member 90, enclosing various channels and passages to confine the fluid therein. Alternatively, the channels and passages may pass completely through the base member 90 and a face plate provided on both sides thereof. The fluid medium employed may be a compressible fluid such as gases, including air or steam, and relatively incompressible fluids such as water or oil.

The analog-type amplifier shown in FIGURE 6 includes a power fluid inlet 91 terminating in a fluid flow restrictor or nozzle 92 for forming power fluid received therein into a power jet. Control fluid inlets 23, 94, 95, 96 are provided, terminating in nozzles 97 through 100, respectively, for forming control fluid received therein into control jets directed against two opposite sides of the power jet. A power fluid passage 101 operates as a receiver for receiving a greater amount of the flow of power fluid from the power jet when the latter is deflected by a control jet issuing from nozzles 97 and/or 98. Power flow passage 102 likewise acts as a receiver for receiving a greater amount of the flow of power fluid from the power jet following deflection thereof by a control jet issuing from nozzles 99 and/or 100. The power flow passages 101 and 102 thus comprise the power fluid outlets of the analog-type fluid amplifier and provide a fluid output differential pressure signal. The analog fluid amplifier derives its nomenclature from the proportional increases and decreases effected in the flows of power fluid in power flow passages 101 and 102, one relative to the other, in response to increases and decreases in the relative magnitudes of the control jets issuing from nozzles 97, 98 and 99, 100, respectively. The magnitude of the pressurized fluid flow in the control jets is small relative to the pressurized flow in the power jet, however, the transverse direction of impingement of the control jets on the power jet effects the deflection thereof. Thus, the analog-type fluid amplifier provides gain, the change in pressurized flow of output power fluid being of larger magnitude relative to the change in pressurized flows of the control fluid. Indentation 103 provided intermediate the power flow passages 101 and 102 may be used for venting. Vents 104 and 105 are also provided to equalize ambient pressures on the opposite sides of the power jet and to remove excess fluid from the deflection region.

The power fluid inlet 91, control fluid inlets 23, 94, 95, 96, and power fluid outlets 101 and 102 may be provided, respectively, with conduits 110, 22, 112, 56, 114, 115, 116 for interconnection of the respectively associated fluid flow passages with other portions of the fluid control system. Thus, conduit 110 is in communication with a source $P_{s3}$ of relatively constant pressurized fluid, conduit 22 is supplied with the proportional signal and conduit 56 is supplied with the reset signal. Conduits 112 and 114 may be provided with a load division signal to be hereinafter described, and, in the more general case, conduits 112, 114 are supplied with auxiliary fluid control signals. Conduits 115 and 116 are connected to the power fluid outlets 101 and 102, respectively, and the fluid output differential pressure signal developed thereacross is supplied to a subsequent portion of the control system. The conduits 110, 22, 112, 56, 114, 115, 116 are represented by circular elements in FIGURE 6 and, illustratively, they comprise cylindrical conduits vertically positioned relative to the plane of base member 90. Alternatively, slots or channels may be provided in the base member extending to the periphery thereof whereby communication with the various passageways may be had by connection of conduits or other channel defining members to the peripheral boundaries of base member 90.

Signal combining fluid control device 11 comprises a first stage of analog amplification for the combined proportional plus reset fluid signals. The output of the first stage 11 of analog amplification is connected to a second stage of analog amplification 120 which also has supplied thereto, as a control fluid signal, a position feedback signal from the final control element 12. Control element 12 is a steam valve actuator in the particular example of controlled apparatus 13 being a steam turbine, and will thus be described hereinafter. The output of the second analog amplifier stage 120 is connected to a third stage of analog amplification comprising an analog-type fluid amplifier 121 which provides an analog power amplifier function.

The control system variable, turbine speed, is controlled by regulating the steam flow to the turbine. In our invention, the steam flow is controlled by employing analog power amplifier 121 to drive a single-sided spring-return actuating piston in steam valve 12. The use of a return spring, that is, a spring loaded piston, assures turbine shutdown in case of hydraulic failure, a desirable feature that gives fail-safe control. The single-sided steam input to the steam valve cylinder of steam valve 12 is supplied from a first fluid receiver of power amplifier 121. The second output of amplifier 121 may be drained through a restrictor for return to the fluid supply system. In the case wherein a closed loop steam valve actuator is desired, a position feedback is needed. A convenient means for obtaining position feedback is illustrated in FIGURE 2 wherein a feedback cam 122 is stroked by the valve stem 123. The tapered feedback cam rides between fixed feedback nozzles 124 and 125 acting as cam followers. The two opposed nozzles 124, 125 are used to compensate for lack of symmetry due to tolerances, misalignments, and thermal distortion. A fluid flow restrictor which may be described as a dropping orifice 126 is provided in a conduit 127 being supplied at a first end thereof with a relatively constant pressurized source of fluid $P_{s4}$. Opposed nozzles 124, 125 are disposed at the second end of conduit 127. A pair of conduits 128, 129 branch from conduit 127 on either side of dropping orifice 126. The pair of conduits 129 and 128 supply the position feedback and bias pressurized fluid signals, respectively, to a second pair of control fluid inlets of the second stage of analog amplification 120. Fluid flow restrictor 130 decreases the $P_{s4}$ signal to a more convenient BIAS level. The operation of the closed loop steam valve actuator may be briefly described as follows. As the steam valve is closed, the spacing between the feedback cam 122 and nozzles 124, 125 decreases, causing the feedback pressure to rise. The rise in feedback pressure, bias pressure being maintained constant, counteracts the fluid signal supplied to the first pair of control fluid inlets of amplifier stage 120 which commands the steam valve to close, thus resulting in a negative feedback to complete the position loop. The output of the first stage of analog amplification 11 may be considered as a position reference signal for the steam valve.

Prime movers, and steam turbines in particular, may often be interconnected in parallel circuit relationship. The parallel operation of a plurality of steam turbines requires some type of load division scheme for dividing the turbine load between the various turbines in a desired manner. A relatively simple load division scheme is of a type known as droop regulation wherein the speed error signal is modified by position feedback from the steam valve. This is the same means employed to obtain position feedback in the closed loop steam valve actuator hereinabove described. The steam valve position represents the load on the turbine. In this simplest form of droop load division, the load division feedback signals are the differential pressure across drooping orifice 126.

Figure 7:
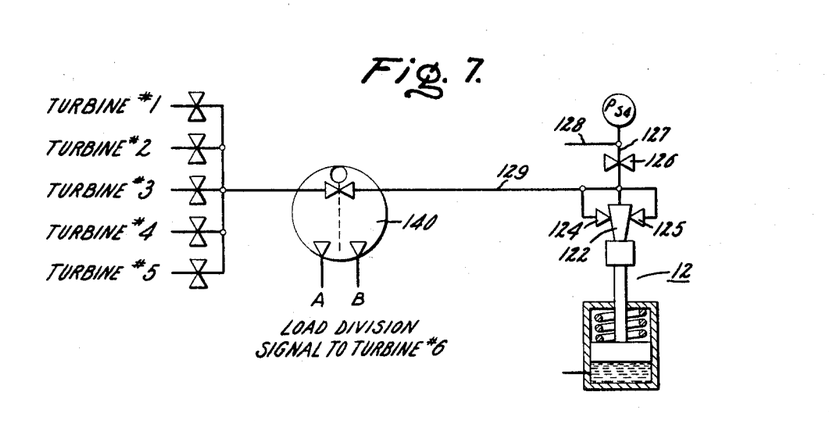
FIGURE 7 is a schematic representation of a load division circuit for supplying load division fluid signals to a four input fluid amplifier illustrated in FIGURES 2 and 6.

A load division circuit constructed in accordance with our invention, and which is appropriate to a plurality of steam turbines connected in parallel relationship is illustrated in FIGURE 7. The droop type load division circuit illustrated in FIGURE 7 relates to six turbines connected in parallel. The valve position of one turbine, designated turbine number 6, is compared to that of the other turbines on the same line and the resultant load division signal A, B is supplied only to turbine number 6. As indicated in FIGURE 7, position feedback signals from turbines 1–5 are averaged and compared to the position feedback signals for the specific turbine being controlled, turbine number 6 in an analog-type fluid amplifier 140. The load division signals A, B are obtained at the fluid receivers of amplifier 140 and supplied to the second pair of control fluid inlets of the signal combining fluid control device 11 of FIGURE 2.

Figure 3:
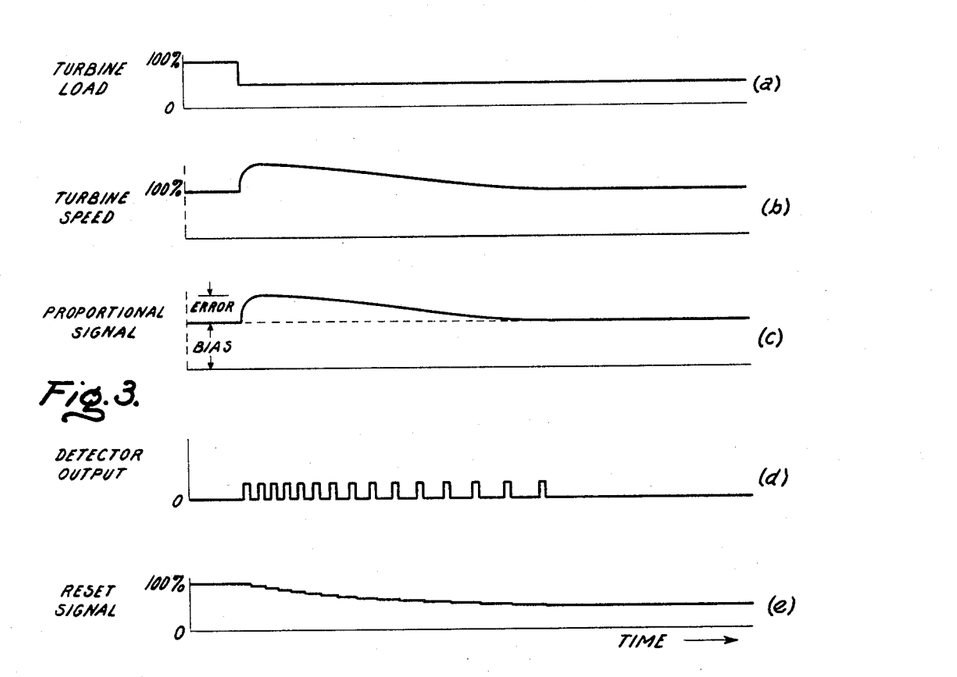
FIGURE 3 is a series of characteristic curves representing the general form of fluid signals existing at various points in the control system of FIGURE 2.

The various elements of the hybrid analog-digital fluid control system having been described, the operation of the overall system will now be summarized with particular reference to FIGURES 2 and 3. Assuming steady state operation of the steam turbine at 100% load and 100% speed, there is a proportional (analog) fluid signal having a particular (BIAS) magnitude of pressurized flow as determined by the characteristics of analog fluid sensor 8 and fluid flow restrictor 21 (see FIGURE 3c). Under the steady state conditions of 100% turbine speed, there is an absence of fluid signals at the output of fluid beat frequently detector 27 as illustrated in FIGURE 3d. The reset signal supplied to signal combining fluid control device 11 has a constant magnitude of pressurized flow which is proportional to the 100% turbine load at the initial conditions herein described. The particular magnitude of the reset signal is sufficiently greater than the BIAS proportional signal to obtain the desired position of the steam valve 12 for the 100% load condition. Now, assume that the steam turbine drops approximately 50% of its load. As illustrated in FIGURE 3a, turbine load drops to its new steady state value of approximately 50% almost instantly. The drop in turbine load causes an overspeed in the turbine, the peak overspeed being approximately 1%, as an example, for a 50% drop in turbine load. The proportional signal, being generated by the fast responding analog circuit, has a wave shape very similar to the actual turbine speed illustrated in FIGURE 3b. Thus, the proportional signal increases in magnitude at a relatively fast rate and would be maintained at its peak value, in the absence of the reset circuit, to regulate the turbine speed at its assumed overspeed value of 101%. The turbine overspeed is detected by the fluid beat frequency detector 27 and the detector output comprises a train of pressurized fluid pulses as indicated in FIGURE 3d wherein the sequence of the pulses is determined by the degree of error in turbine speed. Thus, the pulses are generated in rapid sequence during the interval wherein the turbine speed error is at or near maximum and the sequence rate decreases as the turbine speed error decreases toward zero. The amplitude of the reset signal generated by digital fluid summer 50 decreases in a quantized manner in accordance with the pulses developed at the output of the beat frequency detector. The reset signal decreases from its initial value which provides the 100% turbine load to a steady state value at the end of the transient sufficient to provide the 50% turbine load. The maximum speed error is determined, in general, by the gain or regulation of the analog loop which provides the proportional signal since the proportional signal responds much faster to error than does the reset signal which is limited by the switching of the digital fluid amplifiers within the digital circuit. In like manner, a sudden increase in turbine load results in a decrease in turbine speed whereby the proportional signal also decreases in magnitude in a similar manner. The speed error due to turbine underspeed provides a series of pulses at the output of beat frequency detector 27 which are of a similar nature as illustrated in FIGURE 3*d*. The fluid-operated discriminator 30 detects the fact that the turbine speed is in an underspeed condition as opposed to an overspeed and thereby instructs the fluid-operated counter 28 to count in an up or forward direction causing digital summing device 50 to generate a quantized fluid signal, the reset signal, of a wave form having increasing magnitude with time. The final steady-state magnitude of the reset signal, in the turbine underspeed case, is of magnitude sufficient to maintain the turbine at its new load condition.

The requirements for the reset signal are determined by the factors, reset rate (pulses per second per percent speed error) and quanta size (percent steam flow per pulse) which produce a gain factor for the digital loop (percent steam flow per second per percent speed error). As an example, a reset rate of 4 pulses per percent speed error and a quanta size wherein the steam valve actuator controls steam flow in 6 percent steps for each pulse provides adequate transient and steady-state accuracy for a system having 2½ percent (analog loop) regulation. For this condition a pulse rate of 40 pulses per second results for speed errors as large as 10%. An equivalent transient control is obtained using smaller quanta size steps and increasing the pulse rate. Thus, the quanta size can be reduced to 1% steam flow per pulse and reset rate increased to 24 pulses per second per percent speed error.

From the foregoing description, it can be appreciated that our invention makes available a new fluid-operated isochronous control system of the hybrid analog-digital type. Our particular control system is an isochronous system of the proportional plus reset type wherein an analog control circuit provides an analog-type pressurized fluid signal having a magnitude proportional to the error of the control system variable being regulated. A digital control circuit provides the reset signal, a pressurized fluid signal having a magnitude which varies at a rate proportional to the error, that is, representing the integral of the error. Our control system employs fluid amplifier circuitry in the digital reference, beat frequency detector, reversible binary counter, discriminator, digital summing, signal combining and load division circuits thereof. The fluid amplifiers herein employed have no moving mechanical parts and the control system thereby features reliability and an essentially unlimited life span.

Having described a particular embodiment of our fluid-operated control system directed to a steam turbine speed control, it is believed obvious that modifications and variations of our invention are possible in the light of the above teachings. Thus, appropriate sensor devices are utilized in a modification of our control system for regulating control system variables other than turbine speed. A stage of fluid amplifiers may also be employed, in some instances, between counter 28 and digital summer 50 to provide a buffer amplifier function. It is, therefore, to be understood that changes may be made in the particular embodiment of our invention as described which are within the full intended scope of the invention as defined by the following claims.

I claim:

1. In a fluid-operated control system, the combination of
   first control system circuit means for generating a fluid signal of magnitude proportional to the monitored value of a control system variable,
   second control system circuit means for generating a fluid signal representing the integral of deviation of the monitored value of the control system variable from a desired value thereof, and
   fluid amplifier means for combining the fluid signals generated by said first and second control system circuit means and generating a resultant transient fluid signal in the presence of deviation of the monitored value of the control system variable from the desired value for regulating the control system variable to the desired value.

2. In a fluid-operated control system, the combination of
   first control system circuit means for generating an analog fluid signal of magnitude proportional to the monitored value of a control system variable,
   second control system circuit means for generating a quantized fluid signal proportional to the integral of deviation of the monitored value of the control system variable from a desired value thereof, and
   a fluid control device having a power fluid inlet, two opposed control fluid inlets and two power fluid outlets, a first and second of said control fluid inlets being supplied respectively with the fluid signals generated by said first and second control system circuit means, said fluid control device providing output fluid signals at said power fluid outlets for regulating the control system variable to the desired value.

3. In a fluid-operated control system, the combination of
   a first control system circuit comprising an analog-type sensor for generating an analog fluid signal having a magnitude proportional to the monitored value of a control system variable.
   a second control system circuit comprising
      a digital-type sensor for generating fluid pulses having a frequency proportional to the monitored value of the control system variable,
      means in communication with said digital sensor for generating a quantized fluid signal which is a function of the integral of deviation of the monitored value of the control system variable from a desired value thereof, and
   a fluid amplifier device having a power fluid inlet, at least two oppositely disposed control fluid inlets and two power fluid outlets, a first and second of said opposed control fluid inlets in comunication respectively with said analog sensor and said quantized fluid signal generating means, said fluid amplifier device providing output fluid signals at said power fluid outlets for regulating the control system variable to the desired value.

4. In a fluid-operated control system, the combination of
   a first control system circuit comprising an analog-type sensor for generating an analog fluid signal having a magnitude proportional to the monitored value of a control system variable,
   a second control system circuit comprising
      a digital-type sensor for generating fluid pulses having a frequency proportional to the monitored value of the control system variable, reference means for generating fluid pulses having a frequency proportional to a desired value of the control system variable, and means in communication with said digital sensor and said reference means for generating a quantized fluid signal representing the integral of deviation of the monitored value of the control system variable from the desired value thereof, and a fluid control device having a power fluid inlet, at least two oppositely disposed control fluid inlets and two power fluid outlets, a first and second of said opposed control fluid inlets in communication respectively with said analog sensor and said quantized fluid signal generating means, said fluid control device providing output fluid signals at said power fluid outlets for regulating the control system variable to the desired value.

5. In a fluid-operated control system, the combination of a first control system circuit comprising an analog-type sensor for generating an analog fluid signal having a magnitude proportional to the monitored value of a control system variable, a second control system circuit comprising
- a digital-type sensor for generating fluid pulses having a frequency proportional to the monitored value of the control system variable,
- reference means for generating fluid pulses having a frequency proportional to a desired value of the control system variable,
- a fluid-operated beat frequency detector comprising first and second stages of fluid control devices, said first stage in communication with said digital sensor and said reference means, said second stage generating fluid pulses having a frequency equal to the difference between the frequencies of the pulses generated by said digital sensor and said reference means, and
- means in communication with said beat frequency detector for generating a quantized fluid signal representing the integral of deviation of the monitored value of the control system variable from the desired value thereof, and a fluid control device having a power fluid inlet, at least two oppositely disposed control fluid inlets and two power fluid outlets, a first and second of said opposed control fluid inlets in communication respectively with said analog sensor and said quantized fluid signal generating means, said fluid control device providing output fluid signals at said power fluid outlets for regulating the control system variable to the desired value.

6. In a fluid-operated control system, the combination of a first control system circuit comprising an analog-type sensor for generating an analog fluid signal having a magnitude proportional to the monitored value of a control system variable, a second control system circuit comprising
- a digital-type sensor for generating fluid pulses having a frequency proportional to the monitored value of the control system variable,
- digital reference means for generating fluid pulses having a frequency proportional to a desired value of the control system variable,
- a fluid-operated beat frequency detector comprising first and second stages of fluid control devices, said first stage in communication with said digital sensor and said reference means, said second stage generating fluid pulses having a frequency equal to the difference between the frequencies of the pulses generated by said digital sensor and said reference means,
- a fluid-operated counter in communication with said beat frequency detector for counting the difference-frequency fluid pulses, and
- means in communication with said counter for generating a quantized fluid signal representing the integral of deviation of the monitored value of the control system variable from the desired value thereof, and a fluid control device having a power fluid inlet, at least two oppositely disposed control fluid inlets and two power fluid outlets, a first and second of said opposed control fluid inlets in communication respectively with said analog sensor and said quantized fluid signal generating means, said fluid control device providing output fluid signals at said power fluid outlets for regulating the control system variable to the desired value.

7. In a fluid-operated control system, the combination of a first control system circuit comprising an analog-type sensor for generating an analog fluid signal having a magnitude proportional to the monitored value of a control system variable, a second control system circuit comprising
- a digital-type sensor for generating fluid pulses having a frequency proportional to the monitored value of the control system variable
- digital reference means for generating fluid pulses having a frequency proportional to a desired value of the control system variable,
- a fluid-operated beat frequency detector comprising first and second stages of fluid control devices, said first stage in communication with said digital sensor and said reference means, said second stage generating fluid pulses having a frequency equal to the difference between the frequencies of the pulses generated by said digital sensor and said reference means,
- a fluid-operated reversible counter in communication with said beat frequency detector for counting the difference-frequency fluid pulses,
- fluid-operated means in communication with said said digital sensor for determining the direction of counting of said counter and
- means in communication with said counter for generating a quantized fluid signal representing the integral of deviation of the monitored value of the control system variable from the desired value thereof, and a fluid control device having a power fluid inlet, at least two oppositely disposed control fluid inlets and two power fluid outlets, a first and second of said opposed control fluid inlets in communication respectively with said analog sensor and said quantized fluid signal generating means, said fluid control device providing output fluid signals at said power fluid outlets for regulating the control system variable to the desired value.

8. The combination set forth in claim 7 wherein said counting direction determining means comprises two spring mass devices in vibration inducing conjunction with said digital sensor and having natural vibration frequencies respectively above and below a selected frequency representing a desired value of the control system variable, means for sensing vibration of said spring mass devices and for generating fluid signals representing the monitored value of the control system variable as a function of the natural vibration frequencies, and a digital-type fluid amplifier adapted to provide a memory function, said digital fluid amplifier having a power fluid inlet, two oppositely disposed control fluid inlets and two power fluid outlets, said digital amplifier control fluid inlets in communication with said vibration sensing and generating means for providing mutually exclusive fluid signals in the power fluid outlets thereof wherein each signal is indicative of the status of the monitored control system variable as being greater or smaller than the desired value thereof, said digital amplifier power fluid outlets in communication with said reversible counter.

9. In a fluid-operated control system, the combination of
a first control system circuit comprising an analog-type sensor for generating an analog fluid signal having a magnitude proportional to the monitored value of a control system variable,
a second control system circuit comprising
a digital-type sensor for generating fluid pulses having a frequency proportional to the monitored value of the control system variable,
digital reference means for generating fluid pulses having a frequency proportional to a desired value of the control system variable,
a fluid-operated beat frequency detector comprising first and second stages of a fluid control devices, said first stage in communication with said digital sensor and said reference means, said second stage generating fluid pulses having a frequency equal to the difference between the frequencies of the pulses generated by said digital sensor and said reference means,
a fluid-operated reversible counter comprising a plurality of stages of binary logic in communication with said beat frequency detector for counting the difference-frequency fluid pulses, and
a vortex-type fluid amplifier having a radially disposed power fluid inlet, a plurality of tangentially disposed control fluid inlets and a fluid outlet, said control fluid inlets equal in number to the number of logic stages comprising said counter and in communication therewith whereby said vortex amplifier generates a quantized fluid signal representing the integral of deviation of the monitored value of the control system variable from the desired value thereof, and
a fluid control device having a power fluid inlet, at least two oppositely disposed control fluid inlets and two power fluid outlets, a first and second of said opposed control fluid inlets in communication respectively with said analog senor and said vortex amplifier fluid outlet, said fluid control device providing output fluid signals at said power fluid outlets for regulating the control system variable to the desired value.

10. In a fluid-operated control system, the combination of
a first control system circuit comprising an analog-type sensor for generating an analog fluid signal having a magnitude proportional to the monitored value of a control system variable,
a second control system circuit comprising
a digital-type sensor for generating fluid pulses having a frequency proportional to the monitored value of the control system variable
digital reference means for generating fluid pulses having a frequency proportional to a desired value of the control system variable,
a fluid-operated beat frequency detector comprising first and second stages of fluid control devices, said first stage in communication with said digital sensor and said reference means, said second stage generating fluid pulses having a frequency equal to the difference between the frequencies of the pulses generated by said digital sensor and said reference means,
a fluid-operated reversible counter comprising a plurality of stages of binary logic in communication with said beat frequency detector for counting the difference-frequency fluid pulses,
an operational amplifier comprising an odd number of serially connected analog-type fluid amplifiers, each said analog amplifier having a power fluid inlet, two oppositely disposed control fluid inlets and two power fluid outlets, a first control fluid inlet of the first of said serially connected amplifiers in communication with said counter, a second control fluid inlet of the first of said serially connected amplifiers in communication with a first power fluid outlet of the last of said serially connected amplifiers whereby said amplifiers are connected in negative feedback relationship and said last serially connected amplifier provides a quantized fluid signal representing the integral of deviation of the monitored value of the control system variable from the desired value thereof, and
a fluid control device having a power fluid inlet, at least two oppositely disposed control fluid inlets and two power fluid outlets, a first and second of said latter opposed control fluid inlets in communication respectively with said analog sensor and said first power fluid outlet of the last of said serially connected amplifiers, said fluid control device providing output fluid signals at said fluid control device power fluid outlets for regulating the control system variable to the desired value.

11. In a fluid-operated control system for a plurality of prime movers connected in parallel circuit relationship the combination of
a first control system circuit comprising an analog-type sensor for generating an analog fluid signal having a magnitude proportional to the monitored value of the rotational speed if a first of a plurality of prime movers connected in parallel circuit relationship,
a second control system circuit comprising
a digital-type sensor for generating fluid pulses having a frequency proportional to the monitored value of the rotational speed of the first prime mover,
reference means for generating fluid pulses having a frequency proportional to a desired value of rotational speed, and
means in communication with said digital sensor and said reference means for generating a quantized fluid signal representing the integral of deviation of the monitored value of the rotational speed from the desired value thereof, and
means for generating a load division fluid signal for maintaining a desired distribution of the load on the prime movers, and
a fluid control device having a power fluid inlet, two pairs of oppositely disposed control fluid inlets and two power fluid outlets, a first pair of the latter said opposed control fluid inlets in communication with said analog sensor and said quantized fluid signal generating means, a second pair of the latter said opposed control fluid inlets in communication with said load division signal generating means whereby said fluid control device provides outputs thereof for regulating the rotational speed and load of the first prime mover.

12. In a fluid-operated control system for a plurality of prime movers connected in parallel circuit relationship the combination of
a first control system circuit comprising an analog-type sensor for generating an analog fluid signal having a magnitude proportional to the monitored value of the rotational speed of a first of a plurality of prime movers connected in parallel circuit relationship,
a second control system circuit comprising
a digital-type sensor for generating fluid pulses having a frequency proportional to the monitored value of the rotational speed of the first prime mover,
reference means for generating fluid pulses having a frequency proportional to a desired value of rotational speed, and means in communication with said digital sensor and said reference means for generating a quantized fluid signal representing the integral of deviation of the monitored value of the rotational speed from the desired value thereof, and a third control system circuit comprising an analog-type fluid amplifier having a power fluid inlet, a pair of oppositely disposed control fluid inlets and two power fluid outlets, a first of said pair of control fluid inlets responsive to a fluid signal representing the load of the first prime mover, a second of said pair of control fluid inlets responsive to a fluid signal representing the average load of the remaining prime movers whereby the first prime mover load is compared to the average load of the remaining prime movers and a load division fluid signal is provided at the two power fluid outlets, and a fluid control device having a power fluid inlet, two pair of oppositely disposed control fluid inlets and two power fluid outlets, a first pair of the latter said opposed control fluid inlets in communication with said analog sensor and said quantized fluid signal generating means, a second pair of the latter and opposed control fluid inlets in communication with the two power fluid outlets of said analog fluid amplifier whereby said fluid control device provides output fluid signals at the power fluid outlets thereof for regulating the rotational speed and load of the first prime mover.

References Cited

UNITED STATES PATENTS

| | | | |
|---|---|---|---|
| 3,201,572 | 8/1965 | Yetter | 137—30 X |
| 3,228,602 | 1/1966 | Boothe | 137—81.5 X |
| 3,248,043 | 4/1966 | Taplin | 60—39.28 X |
| 3,232,533 | 2/1966 | Boothe | 137—81.5 |
| 3,285,264 | 11/1966 | Boothe | 137—81.5 |

CLARENCE R. GORDON, *Primary Examiner.*